Figure 1:
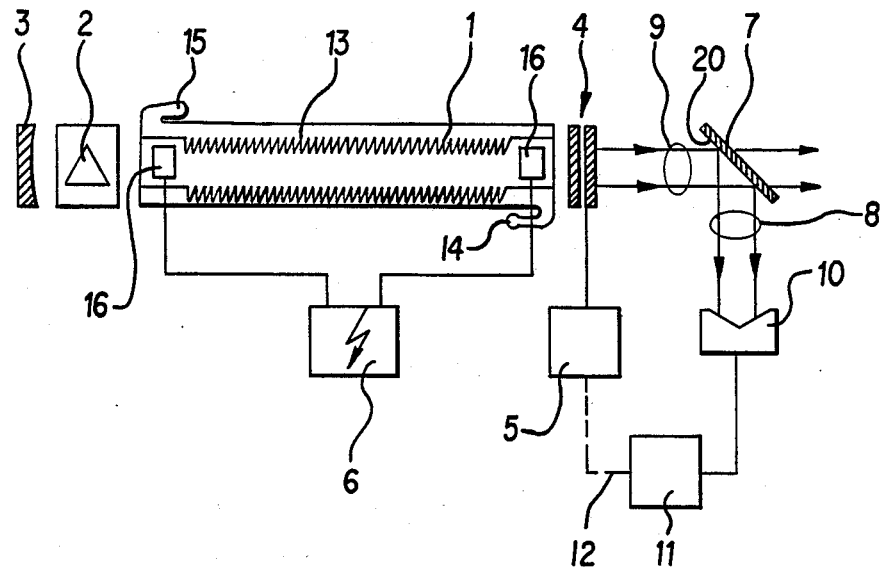

United States Patent [19]

Poehler et al.

[11] Patent Number: 4,845,716
[45] Date of Patent: Jul. 4, 1989

[54] ARRANGEMENT FOR THE WAVELENGTH-SELECTIVE INTERNAL INTENSITY MODULATION AND RADIATION PULSE GENERATION OF HIGH POWER $CO_2$ LASERS

[75] Inventors: Manfred Poehler, Halle-Neustadt; Gisbert Staupendahl; Richard Wittig, both of Halle, all of German Democratic Rep.

[73] Assignee: VEB Kombinat Feinmechanische Werke Halle, Halle, German Democratic Rep.

[21] Appl. No.: 935,452

[22] Filed: Nov. 26, 1986

[30] Foreign Application Priority Data

Jan. 9, 1986 [DD] German Democratic Rep. ................................ 2860725

[51] Int. Cl.[4] ............................................. H01S 3/11
[52] U.S. Cl. ...................................... 372/10; 372/92; 372/98; 372/99; 372/100
[58] Field of Search .................................. 372/29–33, 372/92, 96, 98, 99, 100, 10, 18, 19, 55, 61

[56] References Cited

U.S. PATENT DOCUMENTS 3,803,509 4/1974 Steffen ............................... 331/94.5
4,461,005 7/1984 Ward et al. ............................. 372/10

FOREIGN PATENT DOCUMENTS 2044280 3/1972 Fed. Rep. of Germany .
2223945 11/1973 Fed. Rep. of Germany .
2816659 10/1978 Fed. Rep. of Germany .
134415 2/1979 German Democratic Rep. .
143383 8/1980 German Democratic Rep. .
234208 3/1986 German Democratic Rep. .

OTHER PUBLICATIONS

IEEE Journal of Quantum Electronics, vol. QE-2, No. 8, Aug. 1966, pp. 243–245.
IEEE Journal of Quantum Electronics, vol. QE-2, No. 9, pp. 378–381.
Applied Physics Letters, vol. 11, No. 3, Aug. 1967, pp. 88–89.

Primary Examiner—William L. Sikes
Assistant Examiner—B. R. R. Holloway
Attorney, Agent, or Firm—Jordan and Hamburg

[57] ABSTRACT

An arrangement for the wavelength-selective internal intensity modulation and radiation pulse generation of high power $CO_2$ lasers, in a high-power $CO_2$ laser is forced to operate in the resonator at a freely selectable but fixed wavelength by means of a frequency-selective element and highly angle-selective gas discharge tubes. The possibility of rapidly Q-switching is provided by a special interferometer arrangement of variable reflectivity, functioning as an uncoupling element. The arrangement may furthermore be used for the rapid stabilization of the laser power.

4 Claims, 1 Drawing Sheet

ARRANGEMENT FOR THE WAVELENGTH-SELECTIVE INTERNAL INTENSITY MODULATION AND RADIATION PULSE GENERATION OF HIGH POWER $CO_2$ LASERS

FIELD OF THE INVENTION

The invention relates to an arrangement for the wavelength-selective internal intensity modulation and radiation pulse generation of high-power $CO_2$ lasers, preferably for use in material-processing tasks, such as cutting, welding and hardening of metals or scribing, sputtering and engraving within the scope of modern technologies of the electronics and microelectronics industry, the wood-processing industry, the glass and printing industry, etc., as well as for solving tasks which place special requirements with regard to the radiation parameters, such as isotope separation by means of a laser or the optical pumping of lasers for the far infrared.

BACKGROUND OF THE INVENTION

The internal intensity modulation and radiation pulse generation in high-power $CO_2$ lasers, which take place directly in the laser resonator, is indispensible for extending the possible uses of laser techniques, especially within the setting of the aforementioned areas of application. In particular, for such a modulation and generation of radiation pulses, possibilities are required for external triggering in the sense of freely selectable parameters especially for the pulse peak power or pulse duration and the pulse repetition rate up to aperiodic pulse repetition, a simultaneous wavelength selection being desirable or absolutely essential in numerous applications.

The principle of the transversely excited high-pressure gas laser (TEA laser), which permits exceptionally high peak pulse powers to be realized because of the high pressures of the laser gas, offers one possibility of generating gas laser pulses. However, achieving the high pulse repetition rates is exceptionally problematical in the case of this principle. For example, frequencies of a few hundred hertz already require an enormous technical effort.

The different methods of Q-switching of laser resonators lead to high magnifications of the peak pulse power relative to the power in continuous operation. All previously realized variations, however, have significant disadvantages with respect to laser applications in the areas of use listed above.

A method of gas-laser pulse generation disclosed by Flynn et al. (IEEE Journal of Quantum Electronics, vol. QE-2, 378 (1966)), the active Q-switching by means of a rotating mirror, is unsuitable especially for material processing, since it results in an unfavorable, time-related duty ratio of laser on to laser off and thus in an appreciable loss of average radiation power. Moreover, only periodic pulse repetitions can be achieved.

In Applied Physics Letters 11, 88 (1967), the method of passive Q-switching of $CO_2$ lasers by means of special absorbing gases, which are disposed in the resonator, is described. The disadvantage here is that, due to the gases used and as a function of the respective gas mixture, only a particular pulse repetition rate, which is of the order of a few kHz, is allowed and, on the other hand, the average, switchable laser power is also limited.

The method of modulating by means of the electrooptical effect in crystals, which is very effective in the visible range of the spectrum, is realizable only at great expense in the middle range of the infrared around a wavelength of 10 micrometers, since it requires in this range large crystal lengths which, on the one hand, are associated with unavoidable, relative high absorption losses and, on the other, with high costs, and high control voltages for sufficient depths of modulation (in this connection, see, for example, IEEE Journal of Quantum Electronics, vol. QE-2, 243 (1966)).

The intensity of the laser can also be controlled by using an interferometer arrangement with a selective transmission instead of the partially transparent uncoupling mirror. Such an arrangement is described in German Offlegungschrift No. 2,223,945 as well as in German Offenlegungschrift No. 2,044,280. In both Offenlegungsschriften, electrooptical or magnetooptical effects are proposed for tuning the interferometer arrangement. The two arrangements described are typical, firstly of lasers in the visible range of the spectrum and secondly of lasers of relatively low average output power. Their use in high-power $CO_2$ lasers does not make possible the desired effect of the wavelegth-selective intensity modulation and radiation pulse generation.

A further method, the Bragg diffraction at acoustooptically generated phase gratings suffers from the limited diffraction efficiency, which leads to losses and a relative shallow depth of modulation, which is unsuitable for processing materials with $CO_2$ lasers.

Technically, the possibility of modulating the discharge current of the laser gas discharge is used predominantly. Basically however, this mechanism limits the maximum achievable modulation frequency, if the requirement of a sufficient depth of modulation is to be fulfilled. The limiting frequency for high-power $CO_2$ lasers is at about 2.5 kHz, increasing losses in laser power occurring as the frequency increases above about 1 kHz. Moreover, the mechanism of electrically pulsing the gas discharge limits the achievable magnification of the peak pulse power to a factor of 10, since the processes of the build-up of the population inversion by the gas discharge and the decay of the inversion by the oscillation build-up of the laser overlap in time.

The arrangement proposed in German Offenlegungsschrift No. 2,816,659 represents an attempt to increase the limiting frequency. In this arrangement, the gas laser has at least two gas discharge tubes, connected in series and which can be pumped consecutively with a defined time difference by means of appropriate current pulses. By these means, it is possible to increase the limiting frequency, specified by the pumping mechanism of the gas laser. However, the energy of the individual radiation pulses falls corresponding to the increase in frequency. Moreover, the cost of the equipment increases significantly.

SUMMARY OF THE INVENTION

The object of the invention is to provide an arrangement for the wavelength-selective internal intensity modulation and radiation pulse generation of high-power $CO_2$ lasers, in order to be able to carry out preferably material processing tasks such as scribing, sputtering or engraving in the electronic or microelectronic technology or in lettering systems or such as the cutting of highly reflective materials (aluminum) or the precisely defined hardening of metals in such a manner that, through defined radiation parameters, optimally adapted to the respective task, the highest processing quality (or contour sharpness), accurate guidance of the processing process and a high productivity become possible.

It is the aim of the invention to provide an arrangement for the wavelength-intensive internal intensity modulation and radiation pulse generation of high-power $CO_2$ lasers with external triggering, which is clearly superior in its essential parameters to the hitherto predominantly used electrical modulation or pulsing of the laser gas discharge, aside from the optimum conversion of the available average laser power into radiation pulse power, also a flexible adaptation of the radiation parameters to the particular task to be solved being assured owing to the fact that the arrangement of the invention permits the generation of defined pulse repetitions with high magnification of the peak pulse power and high pulse repetition rates up to several kHz with simultaneous selection of a required wavelength, preferably in the infrared range, with high accuracy and reproducibility.

The solution pursuant to the invention is based on a novel arrangement for the rapid Q-switching of high-power $CO_2$ lasers.

If first of all such a laser is forced, with the help of a frequency-selective element disposed within the resonator, to operate at a freely selectable but fixed wavelength and if secondly instead, due to the use of gas discharge tubes corresponding to WP H 01 S/199 976, (wherein the laser, with a resonator configuration and especially with a choice of the radius of curvature of the one resonator mirror with fixed reflectivity $R_1$, so that it operates in the TEM 00 mode, and an oscillation build-up by way of reflections at the tube walls is prevented), then a practically plane, monochromatic wave field will be available at the laser output. This property is utilized in accordance with the invention to modulate the Q of the laser resonator in such a manner, that the disadvantages of the conventional method of Q switching, particularly the time-related disadjustment of the resonator configuration in the case of active Q-switching and the introduction of absorbers in the resonators in the case of passive Q-switching, which in each case are associated with appreciable losses of average laser power, are avoided.

The second resonator mirror is constructed as an interferometer arrangement of the Fabry-Perot type, which is known per se and which preferably is formed from plates comprising two transparent materials, preferably Ge, GaAs or ZnSe. These plates are metal-coated to the desired extent for the laser wavelength on the two mutually facing plane and parallel sides, while the opposite sides are dereflected. The optical path length $n \times d$ (d is the geometric distance between the two interferometer surfaces, n is the refractive index of the medium between the surfaces) between the two interferometer surfaces should be no less than about the order of magnitude of the laser wavelength and no more than about 1 mm. The excellent interference capability of the plane, monochromatic wave field, produced with the help of the frequency-selective element and the angle-selective gas discharge tube, then makes it possible, by variation of the optical path length $n \times d$, to change the effective reflectivity $R_2$ of this interferometer arrangement within wide limits between $R_{min} \simeq 0$ and the maximum value $R_{max}$, which is specified by the reflectivity of the two interferometer surfaces. For a disappearingly small absorption, this means that the transmission of the system can be varied between $T_{max} \simeq 1$ and $T_{min} \simeq 1 - R_{max}$. In accordance with the invention, this component is constructed so that, by control signals, the optical path length between the interferometer plates can be modulated. If at the same time $R_2$ changes within defined, sufficiently wide limits, then the total resonator losses, that is, the Q of the resonator, are affected so that the intensity of the laser radiation generated is modulated with a great depth of modulation and a high speed. With a sufficiently rapid change in the total resonator losses from one state, in which the laser is below the operating threshold (this state will generally correspond to a relatively small $R_2$) to a state with full laser function (this state generally corresponds to a relatively large $R_2$), radiation pulses with a high power magnification are achieved with this procedure of the invention.

The arrangement described for the wavelength-selective internal intensity modulation and radiation pulse generation of a high-power $CO_2$ laser makes possible a novel method for rapidly stabilizing the output power of the laser, when it is operating in the c.w. mode. For this purpose, a fraction of the operating beam is supplied by way of a beam divider to a fast radiation detector, the measuring signals of which are amplified in an electronic circuit and compared with a specified value. The regulating variable, resulting from the deviation between the specified and the true value, is used in accordance with a further characteristic of the invention to adjust the variable reflectivity $R_2$ of the interferometer arrangement, so that the specified value of the laser power is ensured. In this connection, use is made of the fact that the output power of the laser is a function of the total resonator losses and thus also a function of $R_2$. The time constant of this control adjustment ($\tau$) is determined by the time constants of the detector, the control electronics and the interferometer arrangement and can easily be not greater than 100 $\mu$s. It is thus far superior to the usual control adjustments, which are based on the variation of the gas discharge current.

BRIEF FIGURE DESCRIPTION

The invention will now be described with reference to an example thereof, with reference to the single FIGURE of drawings, which shows a simplified schematic of one embodiment of the invention.

DETAILED DISCLOSURE OF THE INVENTION

FIG. 1 shows an arrangement for the wavelength-selective intensity modulation and radiation pulse generation of a high-power $CO_2$ laser for material processing. The angle-selective laser gas discharge tube 1, in accordance with the tube described in WP H 01 S/199 976 (WB 134,415), and the frequency-selective element 2 ensure that the laser, with appropriate configuration of the resonator and especially with matching of the internal diameter of the gas discharge tube 1 to the radius of curvature of the resonator mirror 3 with the fixed reflectivity $R_1$, operates in the TEM 00 mode.

As illustrated, the gas discharge tube 1, in accordance with the disclosure of said WP 134,415, includes a corrugated tube 13 which may be formed, for example, as a screw thread or with annular grooves. The gas discharge tube is cooled with a coolant entering the coolant inlet 14 and leaving the coolant outlet 15. Radiation modes with excessive divergence, formed from unwanted diffused radiation, are absorbed at the corrugated tube 13. The electrodes 16 are connected to the power supply 6 to ignite the gas discharge. The required plane and monochromatic wave field is then available at the site of the interferometer arrangement 4. The interferometer arrangement 4 is preferably formed by the modulator disclosed in WP H 01 S/264 005 6 (WP 234,208 corresponding to U.S. patent application Ser. No. 739,577, filed May 30, 1985). The modulation of the laser radiation power takes place in the manner described above by changing the reflectivity $R_2$ of this modulator by means of electrical control signals, which are made available by an electrical supply unit 5. Power for the gas discharge is supplied by the power supply unit 6. For the purpose of rapidly stabilizing the laser power of the highpower $CO_2$ laser operating in the c.w. mode, a fraction 8 of the operating beam 9 is supplied via a beam divider 7, preferably a prism lens as described in WP H 01 S/204 920, (WP 143,383) to a fast radiation detector 10.

In accordance with the disclosure of a prism lens in said WP 143,383, the beam divider 7 is of a transparent material, such as germanium. The surface 20 facing the laser is coated so as to be highly reflecting on its plane reflecting surface. The beam divider, in accordance with WP 143,383, is wedge-shaped, with a wedge angle from 8-15 degrees, so that the radiation reflected from the workpiece and penetrating the beam divider no longer reaches a radiation detector (not illustrated) behind the beam divider. A measurement signal is processed in an electronic circuit 11 and the regulating variable 12, resulting from a comparison of the specified to the true value, is utilized by way of the electrical supply device 5 of the interferometer arrangement 4 to adjust the variable reflectivity $R_2$, so that the specified value of the laser power is ensured.

We claim:

1. In an arrangement for the wavelength-selective internal intensity modulation and radiation pulse generation of high-power $CO_2$ lasers, the improvement wherein an associated laser resonator is comprised of
   a first resonator mirror with a fixed reflectivity $R_1$,
   a frequency selective element,
   a highly angle-selective gas-discharge tube, and
   a component of a material transparent to the laser radiation, positioned to serve as a second resonator mirror with a variable reflectivity $R_2$ and comprised of a modulator with a high limiting frequency based on a Fabry-Perot interferometer arrangement with a rapidly variable optical path length, whereby it is possible to change the optical path length by appropriate control signals so that the reflectivity $R_2$ may be adjusted between zero and a maximum, the respective value of $R_2$ being a function of the laser wavelength, the high-power $CO_2$ laser being forced by the frequency-selective and the angle-selective element to operate at a specified fixed wavelength, the total resonator losses are kept constant by the variable reflectivity $R_2$ of the Fabry-Perot interferometer arrangement, so that the continuous output power of the $CO_2$ laser is a maximum at the selected wavelength.

2. The arrangement of claim 1, wherein a fraction of the operating beam is supplied by a beam divider to a fast radiation detector, the measurement signals of which are processed in an electronic circuit, so that the regulating variable resulting from a comparison of the specified value with the true value can be utilized by an electrical supply device of the interferometer arrangement to adjust the variable reflectivity $R_2$, to ensure the specified value of the laser power.

3. In an arrangement for the wavelength-selective internal intensity modulation and radiation pulse generation of high-power $CO_2$ lasers, the improvement wherein the associated laser resonator is comprised of
   a first resonator mirror with a fixed reflectivity $R_1$,
   a frequency selective element,
   a highly angle-selective gas-discharge tube,
   a component of a material transparent to laser radiation, positioned to serve as a second resonator mirror with a variable reflectivity $R_2$ and comprised of a modulator with a high limiting frequency based on a Fabry-Perot interferometer arrangement with a rapidly variable optical path length, whereby it is possible to change the optical path length by appropriate control signals so that the reflectivity $R_2$ may be adjusted between zero and a maximum, the respective value of $R_2$ being a function of the laser wavelength, the high-power $CO_2$ laser being forced by the frequency-selective and said angle-selective element to operate at a specified fixed wavelength, whereby total resonator losses of said laser are changed so rapidly and in such wide limits by the variable reflectivity $R_2$ that the intensity of the resulting laser radiation is modulated with a great depth of modulation and a high speed.

4. The arrangement of claim 3, wherein radiation pulses with a strong peaking flux can be generated by changing the total resonator losses from a state in which the laser is below its operating threshold to a state with full laser function.

* * * * *